(12) United States Patent
Srivastava et al.

(10) Patent No.: US 12,473,430 B2
(45) Date of Patent: Nov. 18, 2025

(54) POLYURETHANE FOAMS FOR COMFORT APPLICATIONS

(71) Applicant: Dow Global Technologies LLC, Midland, MI (US)

(72) Inventors: Yasmin Srivastava, Sugarland, TX (US); William A. Koonce, Lake Jackson, TX (US); Philip H. Sheridan, Marietta, GA (US); Rogelio Gamboa, Brazoria, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 722 days.

(21) Appl. No.: 17/789,906

(22) PCT Filed: Jan. 27, 2021

(86) PCT No.: PCT/US2021/015189
§ 371 (c)(1),
(2) Date: Jun. 29, 2022

(87) PCT Pub. No.: WO2021/154789
PCT Pub. Date: Aug. 5, 2021

(65) Prior Publication Data
US 2023/0055474 A1    Feb. 23, 2023

Related U.S. Application Data

(60) Provisional application No. 62/968,185, filed on Jan. 31, 2020.

(51) Int. Cl.
| | | |
|---|---|---|
| *C08L 75/08* | (2006.01) | |
| *C08G 18/12* | (2006.01) | |
| *C08G 18/32* | (2006.01) | |
| *C08G 18/40* | (2006.01) | |
| *C08G 18/48* | (2006.01) | |
| *C08G 18/63* | (2006.01) | |
| *C08G 18/66* | (2006.01) | |
| *C08G 18/76* | (2006.01) | |
| *C08K 5/5415* | (2006.01) | |

(52) U.S. Cl.
CPC .............. *C08L 75/08* (2013.01); *C08G 18/12* (2013.01); *C08G 18/3206* (2013.01); *C08G 18/4072* (2013.01); *C08G 18/4816* (2013.01); *C08G 18/4841* (2013.01); *C08G 18/4845* (2013.01); *C08G 18/632* (2013.01); *C08G 18/6674* (2013.01); *C08G 18/7621* (2013.01); *C08G 18/7671* (2013.01); *C08K 5/5415* (2013.01); *C08G 2110/0008* (2021.01); *C08G 2110/005* (2021.01); *C08G 2110/0058* (2021.01); *C08G 2110/0083* (2021.01); *C08G 2350/00* (2013.01)

(58) Field of Classification Search
CPC .. C08K 5/5415; C08G 18/12; C08G 18/3206; C08G 18/4072; C08G 18/4812; C08G 18/4816; C08G 18/4833; C08G 18/4841; C08G 18/4845; C08G 18/632; C08G 18/6674; C08G 18/7621; C08G 18/7671; C08G 2110/0008; C08G 2110/005; C08G 2110/0058; C08G 2110/0083; C08G 2350/00; C08L 75/08; C09K 5/063
See application file for complete search history.

(56) References Cited

U.S. PATENT DOCUMENTS

| | | |
|---|---|---|
| 4,365,025 A | 12/1982 | Murch |
| 4,384,051 A | 5/1983 | Guthrie |
| 6,037,382 A | 3/2000 | Huygens |
| 7,993,966 B2 | 8/2011 | Flores |
| 8,753,612 B2 | 6/2014 | DeVreese |
| 9,840,575 B2 | 12/2017 | Srivastava |
| 2010/0196690 A1 | 8/2010 | Neff |

FOREIGN PATENT DOCUMENTS

| | | |
|---|---|---|
| CN | 107090070 A | 8/2013 |
| EP | 2078477 A | 7/2009 |
| WO | 2019/125896 A | 6/2019 |

*Primary Examiner* — Ana L. Woodward
(74) *Attorney, Agent, or Firm* — Warner Norcross + Judd LLP

(57) ABSTRACT

Polyurethane foams that are hydrophilic but nonetheless have low compression sets are made from a combination of MDI and TDI prepolymers, water, and a polymer polyol. The foams optionally are made incorporating a phase change material in the foam formulation. The phase change material does not require encapsulation.

16 Claims, No Drawings

POLYURETHANE FOAMS FOR COMFORT APPLICATIONS

This invention relates to flexible polyurethane foams that are useful in comfort applications such as pillows, mattresses, mattress toppers and seat cushions.

Polyurethane foams are used in very large quantities to make cushioning materials, in particular for bedding and seating. A problem with these foams is that they do not conduct heat very effectively. Thus, heat given off by a user is trapped by the foam in the regions closely adjacent to the user's body. This results in a localized temperature rise that the user often perceives as being uncomfortable.

Various ways have been proposed to address this problem. Increasing the porosity of the foam so air moves in and out of it more easily helps considerably. Making the foam more hydrophilic allows moisture such as perspiration to be wicked away from the user's body more effectively and thus contributes to an increased perception of comfort. So-called "gel technology" is used to impart a sense of coolness to the touch, which is important at point-of-sale.

None of these approaches has been entirely satisfactory. Foams that are highly porous and have high airflows are "breathable" but may lack necessary load bearing characteristics. Hydrophilic foams tend to have poor compression sets. This leads to the foam becoming permanently deformed during regular use, sagging or forming depressions. Formulation modifications to reduce compression sets tend to reduce airflow. Hydrophilic foams also lack the "cool touch" feature that is wanted at point-of-sale.

Phase change materials or "gels" are often used to impart the "cool touch" feature. These materials have a melting or phase transition temperature at about room temperature or slightly higher. They effectively absorb body heat when touched as the material undergoes its phase change. This causes the sensation of coolness when first touched.

Gels are used as surface toppers or infused within the foams. The gels are not breathable and so do not transfer heat effectively. Once the gels become heated to body temperature, they tend to trap heat rather than dissipate it. They also tend to be tacky, and so are commonly encapsulated within polymer films. This further reduces their breathability, worsening the problem.

A polyurethane foam that exhibits good moisture wicking together with a low compression set is wanted for use in bedding and other comfort applications. Ideally, the foam also exhibits a high airflow and a feeling of coolness to the touch.

This invention in one aspect is a flexible polyurethane foam comprising a reaction product of a reaction mixture that comprises a) an isocyanate mixture comprising
  a-1) a first isocyanate-functional prepolymer, which first isocyanate-functional prepolymer is a reaction product of at least one hydroxyl-terminated polymer of ethylene oxide and optionally a hydroxyl-functional branching agent and/or hydroxyl-functional chain extender with an excess of diphenylmethane diisocyanate of which diphenylmethane diisocyanate at least 50 weight-% is 4,4'-diphenylmethane diisocyanate,
  a-2) optionally diphenylmethane diisocyanate, wherein components a-1) and a-2) together have an isocyanate content of 5 to 15% by weight and contain 30 to 75 weight percent of oxyethylene units, based on the combined weight of components a-1) and a-2), and components a-1) and a-2) together constitute 40 to 60% of the total weight of the isocyanate mixture,
  a-3) a second isocyanate-functional prepolymer, which second isocyanate-functional prepolymer is a reaction product of at least one hydroxyl-terminated polymer of ethylene oxide and a hydroxy-functional branching agent having at least three hydroxyl groups per molecule and a hydroxyl equivalent weight of up to 250 g/equivalent with an excess of toluene diisocyanate, and
  a-4) optionally toluene diisocyanate, wherein a-3) and a-4) together have an isocyanate content of 5 to 15% by weight and contain 30 to 75 weight percent of oxyethylene units, based on the combined weight of components a-3) and a-4) and 2 to 5% by weight of residues from the hydroxyl-functional branching agent, based on the combined weight of components a-3) and a-4); components a-3) and a-4) together constitute 40 to 60% of the total weight of the isocyanate mixture; and components a-1), a-2), a-3) and a-4) together constitute the entire weight of the isocyanate mixture;
b) water;
c) at least one polymer polyol comprising polymer particles dispersed in at least one base polyol, the base polyol being a polyether having at least 50% by weight oxypropylene units and a hydroxyl equivalent weight of 500 to 3000 g/equivalent;
d) optionally a poly(ethylene oxide), the poly(ethylene oxide) being a homopolymer of ethylene oxide homopolymer or a random and/or block copolymer of at least 80% by weight ethylene oxide and up to 20% by weight of another alkylene oxide, the poly(ethylene oxide) having a number average molecular weight of 400 to 1200 g/mol;
at least one of e) and f), wherein e) is at least one silicone surfactant; and f) is at least one ethylene oxide/higher alkylene oxide block copolymer, the block copolymer containing 40 to 90% by weight oxyethylene units and having a number average molecular weight of 1500 to 12,000 g/mol; and optionally
g) at least one phase change material that has a melting or glass transition temperature of 25 to 37° C. and which does not contain isocyanate groups or isocyanate-reactive groups;

wherein
  i) the isocyanate mixture constitutes 40 to 65% of the combined weights of components a-g;
  ii) water constitutes 15 to 41% of the combined weights of components a-g;
  iii) the at least one polymer polyol constitutes 8 to 20% of the combined weights of components a-g and the polymer particles constitute 0.5 to 10% of the combined weights of components a-g;
  iv) the poly(ethylene oxide) when present constitutes up to 5% of the combined weights of components a-g;
  v) the at least one silicone surfactant constitutes 0 to 3% of the combined weights of components a-g;
  vi) the at least one ethylene oxide/higher alkylene oxide block copolymer constitutes 0 to 3% of the combined weights of components a-g;
  vii) the at least one phase change material constitutes up to 15% of the combined weights of components a-g and
  viii) components a-g constitute at least 95% of the weight of the reaction mixture.

Flexible polyurethane foams produced in accordance with the invention have an unusual combination of properties that make the foams particularly desirable for use in bedding, seating and other "comfort" applications, in which the foam becomes exposed to the body heat of and/or water vapor evaporating from the body of a human user. These properties include very low compression set, good moisture wicking behavior and an appropriate density. In preferred embodiments, they also exhibit a good airflow and/or a non-zero latent heat in the temperature range of 25 to 37° C. The good airflow and non-zero latent heat each give rise to a "cool touch" feature of the foam. The foam or an article containing the foam may in such applications support at least a portion of the weight of a human user.

The invention is also a method of making a flexible polyurethane foam, comprising A. forming a reaction mixture by mixing:
a) an isocyanate mixture comprising
  a-1) a first isocyanate-functional prepolymer, which first isocyanate-functional prepolymer is a reaction product of at least one hydroxyl-terminated polymer of ethylene oxide and optionally a hydroxyl-functional branching agent and/or a hydroxyl-functional chain extender with an excess of diphenylmethane diisocyanate of which diphenylmethane diisocyanate at least 50 weight-% is 4,4'-diphenylmethane diisocyanate,
  a-2) optionally diphenylmethane diisocyanate, wherein components a-1) and a-2) together have an isocyanate content of 5 to 15% by weight and contain 30 to 75 weight percent of oxyethylene units, based on the combined weight of components a-1) and a-2), and components a-1) and a-2) together constitute 40 to 60% of the total weight of the isocyanate mixture,
  a-3) a second isocyanate-functional prepolymer, which second isocyanate-functional prepolymer is a reaction product of at least one hydroxyl-terminated polymer of ethylene oxide and a hydroxy-functional branching agent having at least three hydroxyl groups per molecule and a hydroxyl equivalent weight of up to 250 g/equivalent with an excess of toluene diisocyanate, and
  a-4) optionally toluene diisocyanate, wherein a-3) and a-4) together have an isocyanate content of 5 to 15% by weight and contain 30 to 75 weight percent of oxyethylene units, based on the combined weight of components a-3) and a-4) and 2 to 5% by weight of residues from the hydroxyl-functional branching agent, based on the combined weight of components a-3) and a-4); components a-3) and a-4) together constitute 40 to 60% of the total weight of the isocyanate mixture; and components a-1), a-2), a-3) and a-4) together constitute the entire weight of the isocyanate mixture;
b) water;
c) at least one polymer polyol comprising polymer particles dispersed in at least one base polyol, the base polyol being a polyether having at least 50% by weight oxypropylene units and a hydroxyl equivalent weight of 500 to 3000 g/equivalent;
d) optionally a poly(ethylene oxide), the poly(ethylene oxide) being a homopolymer of ethylene oxide homopolymer or a random and/or block copolymer of at least 80% by weight ethylene oxide and up to 20% by weight of another alkylene oxide, the poly(ethylene oxide) having a number average molecular weight of 400 to 1200 g/mol;
at least one of e) and f), wherein e) is at least one silicone surfactant; and f) is at least one ethylene oxide/higher alkylene oxide block copolymer, the block copolymer containing 40 to 90% by weight oxyethylene units and having a number average molecular weight of 1500 to 12,000 g/mol; and optionally g) at least one phase change material that has a melting or glass transition temperature of 25 to 37° C. and which does not contain isocyanate groups or isocyanate-reactive groups;
wherein
  i) the isocyanate mixture constitutes 40 to 65% of the combined weights of components a-g;
  ii) water constitutes 15 to 41% of the combined weights of components a-g;
  iii) the at least one polymer polyol constitutes 8 to 20% of the combined weights of components a-g and the polymer particles constitute 0.5 to 10% of the combined weights of components a-g;
  iv) the poly(ethylene oxide) when present constitutes up to 5% of the combined weights of components a-g;
  v) the at least one silicone surfactant constitutes 0 to 3% of the combined weights of components a-g;
  vi) the at least one ethylene oxide/higher alkylene oxide block copolymer constitutes 0 to 3% of the combined weights of components a-g;
  vii) the at least one phase change material constitutes up to 15% of the combined weights of components a-g and
  viii) components a-g constitute at least 95% of the weight of the reaction mixture and
B. reacting the reaction mixture to produce the foam.

Component a-1) of the isocyanate mixture is a first isocyanate-terminated prepolymer, which is a reaction product of at least one hydroxyl-terminated polymer of ethylene oxide and optionally a hydroxyl-containing branching agent and/or chain extender with an excess of diphenylmethane diisocyanate (MDI). At least 50% of the weight of the MDI is the 4,4'-isomer. In some embodiments the 4,4'-isomer constitutes at least 60 or at least 70% of the weight of the diphenylmethane diisocyanate used to make the prepolymer. Up to 100% of the diphenylmethane diisocyanate may be the 4,4'-isomer. The 2,4'-isomer, if present may constitute at least 5%, at least 10% or at least 15% of the weight of the diphenylmethane diisocyanate. The 2,2'-isomer, if present, may constitute up to 5%, or up to 2% of the weight of the diphenylmethane diisocyanate used to make the prepolymer.

The polymer of ethylene oxide is conveniently a hydroxyl-terminated homopolymer of ethylene oxide or a hydroxyl-terminated random or block copolymer of ethylene oxide and 1,2-propylene oxide. The polyether may contain, for example, at least 50% or at least 60% by weight of oxyethylene groups and as much as 100% by weight oxyethylene groups. A polyether of particular interest is a poly(ethylene oxide) homopolymer. Another is a random or block copolymer of ethylene oxide and 1,2-propylene oxide which contains 50 to 99%, preferably 60 to 95%, of oxyethylene groups and correspondingly 5 to 50%, preferably 5 to 40%, of methyloxyethylene (oxypropylene) groups.

The polyether may nominally contain, for example, a number average of 2 to 4 hydroxyl groups per molecule. A preferred nominal average hydroxyl functionality is 2 to 3 and a more preferred nominal average hydroxyl functionality is 2 to 2.5 or 2 to 2.25. Nominal functionality refers to the number of oxyalkylatable groups on the initiator compound used in producing the polyether(s). A primary amino group is considered to contain 2 oxyalkylatable sites for purposes of this invention.

The hydroxyl equivalent weight of the polyether preferably is at least 300 or at least 450, and may be, for example, up to 6000, up to 3000 or up to 2000 g/equivalent. An especially preferred equivalent weight range is 500 to 1800 g/equivalent. All hydroxyl equivalents weights herein are determined by titration methods such as ASTM D4274-99.

A mixture of two or more polyethers as described above may be used to make the first isocyanate-terminated prepolymer.

The first isocyanate-functional prepolymer is conveniently prepared by mixing the MDI with the polyether(s) and subjecting the mixture to conditions under which a portion of the isocyanate groups react with hydroxyl groups of the polyether(s) to form urethane linkages. A hydroxyl-containing branching agent and/or chain extender is optionally present when the first isocyanate-functional prepolymer is formed. Such a branching agent or chain extender may have a hydroxyl equivalent weight of up to 250 or up to 125, and may have at least 3 (preferably 3-8, 3-6 or 3-4) hydroxyl groups per molecule in the case of a branching agent and exactly two hydroxyl groups per molecule in the case of a chain extender. If these are present at all, they are suitably present in an amount of up to 5, preferably up to 2, parts by weight per 100 parts by weight of the polyether(s).

The prepolymer-forming reaction is conveniently performed at an elevated temperature (such as from 60 to 180° C.) and preferably under an inert atmosphere such as nitrogen, helium or argon. An excess of isocyanate groups over hydroxyl groups is provided; in some embodiments the MDI, polyether(s) and optional branching agent and/or chain extender are combined at a ratio of 0.95 to 1.5, especially 0.95 to 1.25 moles of the polyisocyanate(s) per equivalent of hydroxyl groups. The reaction is generally continued until the prepolymer attains a constant isocyanate content, indicating the consumption of essentially all the hydroxyl groups of the polyether.

The first isocyanate-terminated prepolymer preferably is made in the substantial absence of a urethane catalyst, i.e. a catalyst for the reaction of an isocyanate group with a hydroxyl group to form a urethane. In particular, the reaction mixture for forming the first isocyanate-functional prepolymer preferably contains no more than 1 part per million by weight of metals and no more than 100 parts per million by weight of amine compounds. The resulting first isocyanate-terminated prepolymer accordingly contains similarly small amounts of such materials (if any at all). The polyether(s) preferably are not amine-initiated and do not otherwise contain amine groups that exhibit activity as urethane catalysts.

The product of the prepolymer-forming reaction may contain some amount of unreacted MDI, which unreacted MDI when present forms all or part of component a-2) of the isocyanate mixture. MDI may be separately combined with the first isocyanate-functional prepolymer and/or with the other ingredients of the isocyanate mixture, if desired.

The first isocyanate-functional prepolymer and any free MDI in the isocyanate mixture together have an isocyanate content of 5 to 15%, based on the combined weight of the first isocyanate-functional prepolymer and free MDI. The isocyanate content may be at least 6% or at least 7% by weight and may be, for example, up to 12% or up to 10% by weight on the same basis. Isocyanate content may be determined using well-known titration methods.

The first isocyanate-functional prepolymer and any free MDI in the isocyanate mixture together contain 30 to 70 weight percent of oxyethylene units, based on the combined weight of the first isocyanate-functional prepolymer and free MDI. The content of oxyethylene units may be at least 40 weight percent, at least 50 weight percent or at least 55 weight percent and to 70 weight percent or up to 65 weight percent, on the same basis. The percentage of oxyethylene units is a calculated value, determined using the relationship:

$$\% \text{ oxyethylene}_{a1,a2} = \frac{\% \text{ oxyethylene}_{pe} \times \text{wt}_{pe}}{\text{wt}_{pe} + \text{wt}_{br,ce} + \text{wt}_{MDI}}.$$

where % oxyethylene$_{a1,a2}$ is the weight percent of oxyethylene groups in components a-1 and a-2 of the isocyanate mixture, % oxyethylene$_{pe}$ is the weight percent of oxyethylene groups in the polyether(s) used to make the first isocyanate-functional prepolymer, wt$_{pe}$ is the weight of the polyether(s) used to make the first isocyanate-functional prepolymer, wt$_{br,ce}$ is the weight of all branching agents and chain extenders used to make the first isocyanate-functional prepolymer and wt$_{MDI}$ is the weight of the MDI used to make the first isocyanate-functional prepolymer plus any other MDI present in the isocyanate mixture.

Component a-3) of the isocyanate mixture is a second isocyanate-terminated prepolymer, which is a reaction product of at least one hydroxyl-terminated polymer of ethylene oxide and a hydroxyl-containing branching agent with an excess of toluene diisocyanate (TDI). The TDI may be the 2,4-, 2,5- or 2,6-isomer, or a mixture of any two or more thereof. The TDI in some embodiments is a mixture of 50 to 85% of the 2,4-isomer with the remainder being the 2,6-isomer.

The hydroxyl-terminated polymer of ethylene oxide is as described above in connection with the first isocyanate-functional prepolymer.

The branching agent is generally as described with regard to the first isocyanate-functional prepolymer. It has at least 3 hydroxyl groups per molecule and in some embodiments has 3-8, 3-6 or 3-4 hydroxyl groups per molecule. Its hydroxyl equivalent weight may be up to 250, up to 125 or up to 80. Examples include glycerin, trimethylolpropane, trimethylolethane, sorbitol, mannitol, sucrose, pentaerythritol, erythritol, triethanolamine and alkoxylates of any one or more of the foregoing having the aforementioned hydroxyl equivalent weight.

The amount of branching agent is selected such that residues of the branching agent constitute 2 to 5%, preferably 3 to 5%, of the combined weight of components a-3) and a-4). The weight of the residues is calculated from those of the starting materials used in making components a-3) and a-4), as follows:

$$\text{Wt} - \% \text{ branching agent} = \frac{\text{Wt}_{br}}{\text{Wt}_{br} + \text{Wt}_{pe} + \text{Wt}_{ce} + \text{Wt}_{TDI}} \times 100\%$$

where Wt$_{br}$ is the weight of the branching agents used to make component a-3), Wt$_{pe}$ is the weight of the polyether used to make component a-3), Wt$_{ce}$ is the weight of any chain extender used to make component a-3), and Wt$_{TDI}$ is the combined weight of the TDI used to make component a-3) plus the weight of component a-4) (if present).

The second isocyanate-functional prepolymer is conveniently prepared in a manner analogous to that describes above for making the first isocyanate-functional prepolymer, substituting TDI for MDI. The second isocyanate-terminated prepolymer also preferably is made in the substantial absence of a urethane catalyst, i.e. a catalyst for the reaction of an isocyanate group with a hydroxyl group to form a urethane. In particular, the reaction mixture for forming the second isocyanate-functional prepolymer preferably contains no more than 1 part per million by weight of metals and no more than 100 parts per million by weight of amine compounds. The resulting second isocyanate-functional prepolymer accordingly contains similarly small amounts of such materials (if any at all). As before, the polyether(s) preferably are not amine-initiated and do not otherwise contain amine groups that exhibit activity as urethane catalysts.

The product of the prepolymer-forming reaction may contain some amount of unreacted TDI, which unreacted TDI when present forms all or part of component a-4) of the isocyanate mixture. TDI may be separately combined with the second isocyanate-functional prepolymer and/or with the other ingredients of the isocyanate mixture, if desired.

The second isocyanate-functional prepolymer and any free TDI in the isocyanate mixture together have an isocyanate content of 5 to 15%, based on the combined weight of the second isocyanate-functional prepolymer and free TDI. The isocyanate content may be at least 6% or at least 7% by weight and may be, for example, up to 12% or up to 10% by weight on the same basis.

The second isocyanate-functional prepolymer and any free TDI in the isocyanate mixture together contain 30 to 70 weight percent of oxyethylene units, based on the combined weight of the second isocyanate-functional prepolymer and free TDI. The content of oxyethylene units may be at least 40 weight percent or at least 50 weight percent, on the same basis. The percentage of oxyethylene units is a calculated value, being calculated in a manner analogous to that described above, substituting the weight of TDI for the weight of MDI.

The isocyanate mixture constitutes 40 to 65% of the combined weights of components a-g. The isocyanate mixture in some embodiments constitutes at least 45% of the combined weights of components a-g and up to 62.5%, up to 60% or up to 55% thereof.

Water (component b)) constitutes 15-41% of the combined weights of components a-g. Water may constitute at least 17%, at least 19% or at least 20% thereof and may constitute up to 35% or up to 30% thereof.

The polymer polyol (component c)) is a dispersion of polymer particles in a liquid base polyol, the base polyol forming a continuous phase. Some or all of the polymer particles may be grafted to the base polyol. The polymer polyol may also include one or more stabilizers, to which the some or all of the polymer particles may be grafted.

The base polyol is one or more polyethers that has a hydroxyl equivalent weight of 500 to 3000 g/equivalent. The hydroxyl equivalent weight may be at least 800, at least 1000 or at least 1200 and may be, for example, up to 2500, up to 2000 or up to 1800 g/equivalent. The base polyol is a polymer or copolymer of propylene oxide that contains at least 50% by weight oxypropylene units. Homopolymers of propylene oxide and random and/or block copolymers of 50 to 99 weight-% propylene oxide and 1 to 50% ethylene oxide are particularly useful base polyols.

The base polyol may have a nominal functionality of 2 to 6, especially 2 to 4 and most preferably 2 to 3. Actual functionality may be somewhat lower than the nominal functionality in some instances.

An especially preferred type of base polyol is made by homopolymerizing propylene oxide or randomly copolymerizing 75-99.9 weight percent propylene oxide and correspondingly 0.1 to 25 weight percent ethylene oxide onto a di- or trifunctional initiator, and optionally capping the resulting polyether with up to 30% by weight (based on total product weight) ethylene oxide to form a base polyol having mainly primary hydroxyl groups.

The dispersed polymer particles may constitute, for example, at least 1, at least 5 or at least 10 percent of the total weight of the polymer polyol and may constitute, for example, up to 60 percent, up to 50%, up to 40%, up to 30% or up to 20% of the total weight thereof.

The dispersed polymer particles in some embodiments have particle sizes from 100 nm to 25 μm, more typically from 250 nm to 10 μm. Preferably, at least 90 volume-% of the dispersed polymer particles have sizes within these ranges. The particle sizes are taken as diameters of spheres having an equivalent volume. Particle size measurements can be obtained by laser diffraction methods, using equipment such as a Beckman-Coulter LX 13320 laser diffraction particle size analyzer.

The dispersed polymer particles may be, for example, polyurea, polyurethane, and/or polyhydrazide, and/or or a polymer of one or more vinyl monomers. Useful vinyl monomers include, for example, various polyolefins (such as polymers and copolymers of ethylene), various polyesters, various polyamides, various polycarbonates, various polymers and copolymers of acrylic and/or methacrylic esters, a homopolymer or copolymer of styrene, a homopolymer or copolymer of acrylonitrile and the like. In some embodiments, the dispersed particles are styrene-acrylonitrile copolymer particles.

At least a portion of the dispersed polymer particles preferably are grafted onto at least a portion of a stabilizer and/or the base polyol molecules that form the continuous phase.

Dispersions of polyurea particles can be prepared by reacting a primary or secondary amine with a polyisocyanate in the presence of the base polyol. Methods for producing polyurea dispersions are described, for example, in WO 2012/154831.

Dispersions of polyurethane particles can be prepared by reacting a low equivalent weight polyol or aminoalcohol with a polyisocyanate in the presence of the base polyol. Methods for producing such dispersions are described, for example, in U.S. Pat. No. 4,305,857, WO 94/20558, and WO 2012/154820.

Dispersions of polymerized vinyl monomers can be prepared by the in situ polymerization of such monomers in the base polyol. Such methods are described, for example, U.S. Pat. Nos. 4,513,124, 4,588,830, 4,640,935 and 5,854,386. Alternatively, dispersions of this type can be formed in a melt dispersion process, in which a previously-formed vinyl polymer is melted and dispersed into the base polyol. Methods of this type are described in U.S. Pat. No. 6,613,827 and WO 2009/155427.

The polymer polyol(s) constitute at least 8 percent of the combined weights of components a-g. In some embodiments the polymer polyol(s) constitute at least 9 percent thereof. The polymer polyol(s) constitute up to 20% of the combined weights of components a-e and may constitute up to 18%, up to 15% or up to 12% thereof.

The dispersed polymer particles constitute 0.5 to 10% of the combined weights of components a-g. The dispersed polymer particles may constitute at least 1%, at least 2% or at least 4% thereof and up to 8% thereof.

The polymer polyol preferably contains no more than 5 parts per million by weight or no more than 1 part per million by weight of metals and no more than 100 parts per million of amine compounds. The base polyol(s) preferably are not amine-initiated and do not otherwise contain amine groups that exhibit activity as urethane catalysts.

The poly(ethylene oxide) (component d)) is a homopolymer of ethylene oxide or a random and/or block copolymer of alkylene oxides of which alkylene oxides at least 80% by weight is ethylene oxide and up to 20% by weight is one or more other alkylene oxides. The other alkylene oxide, when present, may include or be 1,2-propylene oxide. The poly(ethylene oxide) may have a molecular weight of 400 to 1200 g/mol by GPC. It preferably contains at least 1 hydroxyl group per molecule. It more preferably nominally contains at least 2 hydroxyl groups per molecule and up to 6, up to 4 or up to 3 hydroxyl groups per molecule.

Useful silicone surfactants (component e)) are self-dispersible and/or soluble in water. Included among the useful silicone surfactants are block copolymers having at least one polysiloxane block and at least one polyether block. Such block copolymers may be, for example, A-B or B-A-B type copolymers wherein A represents the polysiloxane block and each B represents a polyether block. Such block copolymer may be a pendant graft-type structure in which multiple polyether blocks depend from a polysiloxane block. Each polyether block is preferably a homopolymer or copolymer of ethylene oxide. A copolymer of ethylene oxide may be a copolymer of ethylene oxide and propylene oxide.

The silicone surfactant may contain, for example, 20 to 80% by weight polysiloxane, 20 to 75% by weight polymerized ethylene oxide and 0 to 50% by weight polymerized propylene oxide, based on the total weight of the silicone surfactant. A more preferred silicone surfactant contains 20 to 80% by weight polysiloxane, 20 to 75% by weight polymerized ethylene oxide and 0 to 20% by weight polymerized propylene oxide. A still more preferred silicone surfactant contains 25 to 50% by weight polysiloxane, 50 to 75% by weight polymerized ethylene oxide and 0 to 10% by weight polymerized propylene oxide.

Suitable silicone surfactants are commercially available and include, for example, water soluble surfactants sold by Momentive Performance Products under the Silwet® product designation. This include, for example, Silwet® L-7002, L-7200, L-7230, L-7600, L-7604, L-7605 and L7657 surfactants.

The silicone surfactant(s) constitute 0 to 3% of the combined weights of components a-g. The silicone surfactant(s) may constitute at least 0.5%, at least 0.75% or at least 1% thereof and may constitute up to 2.5% or 2% thereof.

The block copolymer of ethylene oxide and a higher alkylene oxide (component 0) contains one or more oxyethylene blocks and one or more blocks of a polymerized higher alkylene oxide. The higher alkylene oxide may be, for example, 1,2-propylene oxide, 1,2-butylene oxide or a mixture thereof. Such block copolymers may contain, for example, 40 to 90% by weight oxyethylene units and have number average molecular weights of 1500 to 12,000 g/mol (by gel permeation chromatography against polystyrene standards). Such block copolymers may have one or more hydroxyl groups, such as 1 to 4 hydroxyl groups or 2 to 4 hydroxyl groups. Examples of suitable block copolymers include those sold by The Dow Chemical Company under the Tergitol™ trade name, and those sold by BASF under the Pluronics™ trade name.

The block copolymer of ethylene oxide and a higher alkylene oxide preferably contains no more than 5 parts per million by weight or no more than 1 part per million by weight of metals and no more than 100 parts per million of amine compounds. It preferably is not amine-initiated.

The block copolymer of ethylene oxide and higher alkylene oxide may constitute 0 to 3% of the combined weights of components a-g. It may constitute at least 0.5%, at least 0.75% or at least 1% thereof and may constitute up to 2.5% or up to 2% thereof.

The phase change material (component g)) is one or more materials that have a melting or glass transition temperature of 25 to 37° C. and which does not contain isocyanate groups or isocyanate-reactive groups. The phase change material may be or contain, for example, any one or more of a natural or synthetic wax such as a polyethylene wax, bees wax, lanolin, carnauba wax, candelilla wax, ouricury wax, sugarcane wax, jojoba wax, epicuticular wax, coconut wax, petroleum wax or paraffin wax. The phase change material preferably has a melting temperature of 25 to 32° C., especially 28 to 32° C.

The phase change material preferably is not encapsulated, i.e., is not contained within a film or other container that forms a physical barrier between the phase change material and the remaining ingredients of the reaction mixture.

The phase change material when present constitutes up to 15% of the combined weights of components a-g. In some embodiments it constitutes at least 1%, at least 2% or at least 2.5% thereof and in some embodiment it constitutes up to 12.5 or up to 10% thereof.

The reaction mixture may contain one or more optional ingredients in addition to components a-g as described above. Such optional ingredients, if present, together constitute no more than 5% of the weight of the reaction mixture.

Among the suitable optional ingredients are one or more branching agents and/or chain extenders as described before in connection with the preparation of the quasi-prepolymers, but these can be omitted.

The reaction mixture also may contain various ingredients such as colorants, antioxidants, preservatives, biocides, fragrances, thickening agents (such as xanthan gum, various water-soluble cellulose ethers or polyacrylamide), mixing aids, wetting agents (when fillers are present) and the like. If present, these preferably constitute up to 10% or up to 5% of the total weight of the reaction mixture.

The reaction mixture for making the polyurethane foam preferably is essentially devoid of a curing catalyst, i.e. a catalyst for the reaction of isocyanate groups toward water and/or alcohol groups. In particular, the reaction mixture preferably contains no more than 5 parts per million, preferably no more than 1 part per million, by weight of metals and no more than 100 parts per million by weight of amine compounds.

The reaction mixture may contain, in addition to components a-g, one or more solid components such as fillers and reinforcing materials. Examples of fillers include clays, diatomaceous earth, calcium carbonate, wollastonite, ground polymer particles, wood flour, cork flour, glass or other ceramic particles, and various types of natural and synthetic fibers, which fibers may be woven, knitted or entangled if desired. Such solid components may constitute up to 75 percent of the total weight of the reaction mixture.

Polyurethane foam is made by combining the ingredients to form a reaction mixture and subjecting the resulting reaction mixture to conditions at which the isocyanate-functional quasi-prepolymer and one or more of components b-g react to form the flexible polyurethane foam.

Ingredients a-g can be combined in any order, although it is preferred to add the polyisocyanate mixture last or simultaneously with the other ingredients to avoid premature reaction before the rest of the ingredients can be added. Thus, for example, components b-g can be combined first, followed by adding the polyisocyanate mixture. Alternatively, components a-g can all be combined at once. It is also possible to form components b-e into various subcombinations that are combined when the polyisocyanate mixture is added. Optional ingredients that are isocyanate-reactive or water-soluble can be added together with the water or separately.

Curing occurs spontaneously upon mixing the water with the polyisocyanate mixture, and so a broad range of conditions is suitable for performing the reaction. The curing temperature may be as low as 0° C. or as high as, for example, 100° C. Temperatures near room temperature or slightly elevated temperature are entirely suitable and generally preferred. Thus, the curing temperature may be at least 15° C. or at least 20° C. and up to 50° C., up to 40° C. or up to 35° C. The curing reaction produces carbon dioxide gas that forms cells and expands the reaction mixture as the curing takes place.

The curing step may be performed in an open container, in which the rising foam expands against the weight of the atmosphere and/or the weight of a thin film. Such a free-rise process may be performed by dispensing the reaction mixture into a trough where it rises and cures.

The curing step may instead be performed in a closed container such as a closed mold, in which expansion is constrained by the internal dimensions of the cavity to produce a foam having a size and shape corresponding to that of the mold cavity.

The amount of water in the reaction mixture is far in excess of the amount of isocyanate groups of the isocyanate mixture. Because of this, the cured foam often contains a significant amount of moisture that may be at least partially in the form of a liquid contained in the cells of the foam. A drying step may be performed to remove some or all of this excess water.

Such a drying step can be performed, for example, by passing a dry gas through the foam, by allowing the foam to sit under a dry atmosphere, and/or by heating the foam to a temperature of, for example, 50 to 150° C. Drying can be performed until any desirable moisture content is achieved. In some embodiments, drying is performed until a constant foam weight is achieved, indicating the removal of all residual water from the foam.

Foam of the invention may have a foam density after drying of, for example, 40 to 144 kg/m$^3$, as measured according to ASTM D3574. A significant advantage of this invention is that foam densities of 80 kg/m$^3$ and below are readily obtained. In some embodiments, the foam density is 48 to 80 kg/m$^3$.

When dried, the foam of the invention exhibits a low compression set in addition to low foam density. Compression set is measured in accordance with ASTM D-3774:D on 5×5×2.54 cm skinless specimens. The thicknesses of the specimens are measured with a micrometer. The specimens are then put between steel plates, compressed by 90% of their original thickness and aged under compression at 70° C. for 22 hours. The specimens are then removed from the test apparatus and permitted to recover at room temperature for 30 minutes before remeasuring their thicknesses. Compression set is calculated as [100%×(original thickness−final thickness)]÷original thickness. Compression set is typically less than 10%. Compression set in preferred embodiments may be 8% or less, 6% or less or even 5% or less.

Foam of the invention that contains a phase change material (component g)), when dried to constant weight as described above, may exhibit a latent heat at 27° C., as measured by differential scanning calorimetry, of at least 2.5 J/g. Its latent heat may be at least 4 J/g, at least 8 J/g, at least 10 J/g or at least 14 J/g at that temperature. In some embodiments, the latent heat may be as much as 25 J/g or much as 30 J/g at that temperature, or even higher.

Foam of the invention may exhibit an airflow of at least 0.8 L/s as measured according to ASTM D3574 test G. The airflow may be at least 1.2 L/s or at least 1.4 L/s and may be, for example, up to 5 L/s or up to 4 L/s.

The foam in some embodiments exhibits a moisture wicking time of 5 seconds or less, preferably 4 seconds or less. Moisture wicking time is measured on 5×5×2.54 cm skinless samples that are dried to constant weight. 3 mL of room temperature water is slowly dropped onto the top surface of the foam sample from a pipette and the amount of time required for the foam to absorb the water is recorded as the wicking time.

Foam of the invention is useful for bedding, seating and other "comfort" applications. Comfort applications include those in which during use the foam becomes exposed to the body heat of or water vapor evaporating from the body of a human user. The foam or an article containing the foam in such applications often supports at least a portion of the weight of a human user and becomes compressed during use. Examples of such comfort applications include pillows; mattress toppers, mattresses, comforters, furniture and/or automotive seating; quilting; insulated clothing and the like. Another application of interest is padding for prosthetic limbs.

The following examples are provided to illustrate the invention, but are not intended to limit the scope thereof. All parts and percentages are by weight unless otherwise indicated.

Polyisocyanate 1 is made by first preheating a mixture of 57.9 parts of a 1000 g/mol number average molecular weight poly(ethylene oxide) homopolymer and 3.8 parts of trimethylolpropane to 80° C. Separately, 33.8 parts of an 80/20 mixture of 2,4- and 2,6-toluene diisocyanate (TDI) are heated to 40° C. 0.004 part of benzoyl chloride is added to the TDI. The polyol mixture is added to the TDI and the resulting reaction mixture is heated to 74° C. until a constant isocyanate content of 8% is achieved. An additional 4.4 parts of the TDI is mixed in. The resulting product is cooled to below 60° C. The isocyanate content is measured as 9.45-10.3 wt % according to ASTM D5155. The viscosity is measured as 18,000-21,000 mPa-s @ 25° C. according to ASTM D4065. Polyisocyanate 1 contains about 95.6 weight percent of a prepolymer of TDI and the polyols, about 3.8 weight percent residues of the branching agent (trimethylolpropane) and about 4.4 weight percent of free TDI. Polyisocyanate 1 contains 57.9% oxyethylene units by calculation.

Polyisocyanate 2 is made by first preheating to 80° C. a mixture of 32 parts of a 1000 g/mol number average molecular weight poly(ethylene oxide) homopolymer and 13 parts of a 5000 g/mol number average molecular weight, nominally trifunctional random copolymer of propylene oxide and ethylene oxide, which contains 75% oxyethylene units. Separately, 35 parts of a 79/21 mixture of 4,4'- and 2,4'-diphenylmethane diisocyanate (MDI) are heated to 55° C. 0.003 part of benzoyl chloride is added to the MDI. The polyol mixture and MDI are combined and the resulting reaction mixture is heated to 75° C. until a constant isocyanate content is achieved. The resulting product is cooled to below 60° C. The isocyanate content is measured as 7 wt % according to ASTM D5155. Polyisocyanate 2 contains a prepolymer of MDI and the polyols and a small amount of free MDI. Polyisocyanate 2 contains 61.75% oxyethylene units by calculation. The viscosity of Polyisocyanate 2 is about 20,000 cps at 25° C.

Polyisocyanate 3 is made by first preheating a mixture of 71.1 parts of a 1000 number average molecular weight poly(ethylene oxide) homopolymer and 1.1 parts of trimethylolpropane to 80° C. Separately, 27.8 parts of an 80/20 mixture of 2,4- and 2,6-toluene diisocyanate (TDI) are heated to 40° C. 0.007 part of benzoyl chloride is added to the TDI. The polyol mixture is added to the TDI and the resulting reaction mixture is heated to 74° C. until a constant isocyanate content of 6.25% is achieved. The resulting product is cooled to below 60° C. Polyisocyanate 3 contains a prepolymer of TDI and the polyols. A small amount of free TDI may be present. Polyisocyanate 3 contains 66.2% oxyethylene units and about 1.1 weight percent residues of the branching agent.

Polyisocyanate 4 is made by first preheating a mixture of 66.2 parts of a 1000 number average molecular weight poly(ethylene oxide) homopolymer and 2.4 parts of trimethylolpropane to 80° C. Separately, 30.4 parts of an 80/20 mixture of 2,4- and 2,6-toluene diisocyanate (TDI) are heated to 40° C. 0.05 part of benzo-4,4-thiobis(6-tert-butyl-m-cresol) is added to the TDI. The polyol mixture is added to the TDI and the resulting reaction mixture is heated to 74° C. until a constant isocyanate content is achieved. One part of dicyclohexylmethane-4,4'-diisocyanate is mixed in. The resulting product is cooled to below 60° C. The isocyanate content is measured as 6.8 wt % according to ASTM D5155. Polyisocyanate 3 contains a prepolymer of TDI and the polyols, and may contain a small amount of free TDI and/or a small amount of free dicyclohexylmethane-4-4'-diisocyanate. Polyisocyanate 4 contains about 66.2% by weight oxyethylene units and about 2.4% residues from the branching agent.

Polyisocyanate 5 is made by first preheating a 1000 equivalent weight, nominally difunctional propylene oxide homopolymer to 80° C. Separately, 35 parts of a 69/31 mixture of 4,4'- and 2,4'-diphenylmethane diisocyanate (MDI) are heated to 55° C. 0.003 part of benzoyl chloride is added to the MDI. The polyol mixture and MDI are combined and the resulting reaction mixture is heated to 75° C. until a constant isocyanate content of 7% is achieved. The resulting product is cooled to below 60° C. Polyisocyanate 5 contains a prepolymer of MDI and the polyols, and free MDI. Polyisocyanate 5 contains no oxyethylene units.

Surfactant A is an organosilicone surfactant marketed by Momentive Performance Materials under the trade name Silwet®.

Surfactant B is an ethylene oxide/propylene oxide/ethylene oxide triblock copolymer. The central poly(propylene oxide) block of the copolymer has a molecular weight of 1750. The outer poly(ethylene oxide) blocks constitute 80% of the total weight of the copolymer. The copolymer has a nominal hydroxyl functionality of 2.

The PCM (phase change material) is a non-encapsulated paraffin wax having a melting temperature of 28° C.

The CPP is a polymer polyol having a hydroxyl number of about 22. The base polyol is a nominally trifunctional, 36.5 hydroxyl number copolymer of propylene oxide and ethylene oxide, the oxyethylene content of the base polyol being about 20% by weight. The dispersed phase is styrene-acrylonitrile particles. The solids content (weight of styrene-acrylonitrile particles) is about 40% by weight.

The Poly(EO) is a glycerin-initiated, nominally trifunctional ethylene oxide homopolymer having a hydroxyl number of 270 mg KOH/g and a number average molecular weight of 624 g/mol.

Polyurethane foams are made using the ingredients as indicated in Tables 1-4 below. The Polyisocyanate in each case is combined at room temperature with the remaining ingredients on a high speed laboratory mixer for 20 seconds. The resulting reaction mixture is poured into an open mold lined with a polyethylene sheet. The foams rise and cure in the mold. When dimensionally stable, the foams are demolded and cured under ambient conditions for at least 24 hours. The skins are removed from the foams before taking samples for property testing.

Moisture wicking time is measured on 5×5×2.54 cm skinless samples that are dried to constant weight. 3 mL of room temperature water is slowly dropped onto the top surface of the foam sample from a pipette and the amount Foam density is measured according to ASTM D3574A.

Compression set is determined using three 2"×2"×1" (5.08 cm×5.08 cm×2.54 cm) core specimens. The samples are measured with a Litematic Micrometer for thickness and put between steel plates with 0.1" (2.54 mm) spacers to measure 90% deflection. The foams are aged in a 70° C. oven for 22 hours. After 22 hours, the specimens are removed and allowed to recover for 30 minutes before final measurement is taken in accordance to ASTM D3574: D.

Airflow is measured on crushed foam samples according to ASTM D3574: G.

Latent heat is measured by differential scanning calorimetry.

K-factor is measured using a Laser Comp Heat Flow Meter at a mean test temperature of 75° F. and a 40° F. test temperature differential.

Comparative Samples A-E

Comparative Samples A-E are made from recipes as set forth in Table 1. Results of the foam testing of these samples are as indicated in Table 1.

TABLE 1

| Ingredient | Parts by Weight | | | | |
| --- | --- | --- | --- | --- | --- |
|  | Comp. A* | Comp. B* | Comp. C* | Comp. D* | Comp. E* |
| Water | 29.5 | 29.5 | 29.5 | 29.5 | 29.5 |
| Surfactant A | 1.75 | 1.75 | 1.75 | 1.75 | 1.75 |
| Surfactant B | 1.75 | 1.75 | 1.75 | 1.75 | 1.75 |
| CPP | 17 | 17 | 17 | 17 | 17 |
| PCM | 0 | 0 | 0 | 0 | 0 |
| Poly(EO) | 0 | 0 | 0 | 0 | 0 |
| Polyisocyanate 1 | 0 | 15 | 0 | 0 | 25 |
| Polyisocyanate 2 | 50 | 35 | 25 | 25 | 0 |
| Polyisocyanate 3 | 0 | 0 | 25 | 0 | 0 |
| Polyisocyanate 4 | 0 | 0 | 0 | 25 | 0 |
| Polyisocyanate 5 | 0 | 0 | 0 | 0 | 25 |
| Test Results | | | | | |

TABLE 1-continued

| Ingredient | Comp. A* | Comp. B* | Comp. C* | Comp. D* | Comp. E* |
|---|---|---|---|---|---|
| | Parts by Weight | | | | |
| Moisture Wicking, s | 4 | 4 | 4 | 4 | 4 |
| Density, lb/ft$^3$ (kg/m$^3$) | 5.05 (80.8) | 4.85 (77.6) | 5.40 (86.4) | 5.35 (85.6) | 7.40 (118.4) |
| Airflow, scfm (L/s) | 1.63 (0.77) | 2.43 (1.14) | 2.09 (0.98) | 1.57 (0.74) | 3.46 (1.63) |
| 90% Compression Set, % | 88.8 | 31.2 | 84.6 | 57.4 | 86.3 |
| Latent Heat at 27° C. (J/g) | 0 | 0 | 0 | 0 | 0 |
| k-factor | 0.3 | 0.3 | 0.3 | 0.3 | 0.3 |

*Not an example of the invention.

These foams are made without phase change material to simplify the formulations and to isolate the effects of varying polyisocyanate compositions. The latent heats at 27° C. of zero in each case reflects the absence of a phase change material. As the data in Table 1 shows, foam properties are highly dependent on the selection of polyisocyanate, in unpredictable ways.

Polyisocyanate 2 (Comp. A) by itself results in a foam that has extremely high compression set. When Polyisocyanates 1 and 2 are used together in a 30/70 ratio (Comp. B), the compression set improves, although the compression set of 31.2% is far too high for this foam to be useful in bedding applications.

A 50/50 blend of Polyisocyanate 2 with either Polyisocyanate 3 (Comp. C) or Polyisocyanate 4 (Comp. D) leads to high compression sets; the airflow of Comp. D is also diminished. A 50/50 blend of Polyisocyanate 1 and Polyisocyanate 5 (Comp. E) yields very poor compression set. Taken together, these results demonstrate a great variability in foam properties due to changes in polyisocyanate, with none of the polyisocyanates being useful to achieve a low compression set.

EXAMPLES 1-3

Examples 1-3 are made from recipes as set forth in Table 2. Results of the foam testing of these samples are as indicated in Table 2.

TABLE 2

| Ingredient | Ex. 1 | Ex. 2 | Ex. 3 |
|---|---|---|---|
| | Parts by Weight | | |
| Water | 29.5 | 31.25 | 31.25 |
| Surfactant A | 1.75 | 0 | 1.75 |
| Surfactant B | 1.75 | 1.75 | 0 |
| CPP | 17 | 17 | 17 |
| PCM | 0 | 0 | 0 |
| Poly(EO) | 0 | 0 | 0 |
| Polyisocyanate 1 | 25 | 25 | 25 |
| Polyisocyanate 2 | 25 | 25 | 25 |
| | Results | | |
| Moisture Wicking, s | 4 | 4 | 4 |
| Density, lb/ft$^3$ (kg/m$^3$) | 4.61 (73.8) | 4.58 (73.3) | 4.78 (76.5) |
| Airflow, scfm (L/s) | 3.04 (1.43) | 0.3 (0.14) | 1.09 (0.51) |
| 90% Compression Set, % | 9.7 | 9.2 | 7.2 |
| Latent Heat at 27° C. (J/g) | 0 | 0 | 0 |
| k-factor | 0.3 | 0.3 | 0.3 |

These results demonstrate the effect of using a 50/50 mixture of Polyisocyanates 1 and 2, together with three different surfactant packages. Ex. 1 is a direct comparison with Comp. Sample C (Table 1), the difference being a higher level of branching in the TDI prepolymer of Example 1 (Prepolymer 1, 3.8 weight-% branching agent) compared to the TDI prepolymer of Comparative Sample C (Prepolymer 3, 1.1 weight-% branching agent). The more highly branched Prepolymer 1 leads to a dramatic reduction in compression set (9.7% vs. 84.6% for Comp. Sample C).

Example 1 in comparison with Comp. Sample B demonstrates the effect of the ratio of components a-1) plus a-2) to components a-3) plus a-4). Too much of components a-3) plus a-4) leads to a large increase in compression set (31.2 for Comp. Sample B vs. only 9.7% for Example 1.

Examples 2 and 3 show the effect of using only one of Surfactants A and B. Very low compression sets are obtained in all of Examples 1-3, but airflows are much lower when only one of the surfactants is present, as in Examples 2 and 3. Latent heats at 27° C. are zero due to the lack of a phase change material.

Comparative Samples F and G

Comparative Samples F and G are made from recipes as set forth in Table 3. Results of the foam testing of these samples are as indicated in Table 3.

TABLE 3

| Ingredient | Comp. F* | Comp. G* |
|---|---|---|
| | Parts by Weight | |
| Water | 29.5 | 29.5 |
| Surfactant A | 1.75 | 1.75 |
| Surfactant B | 1.75 | 1.75 |
| CPP | 25 | 5 |
| PCM | 0 | 0 |
| Poly(EO) | 0 | 0 |
| Polyisocyanate 1 | 25 | 25 |
| Polyisocyanate 2 | 25 | 25 |
| | Results | |
| Moisture Wicking, s | 4 | 4 |
| Density, lb/ft$^3$ (kg/m$^3$) | 4.77 (76.3) | 4.95 (79.2) |
| Airflow, scfm (L/s) | 3.94 (1.85) | 8.4 (3.95) |
| 90% Compression Set, % | 14.7 | 84.6 |
| Latent Heat at 27° C. (J/g) | 0 | 0 |
| k-factor | 0.3 | 0.3 |

*Not an example of the invention.

Comp. Examples F and G illustrate the effect of increasing (Comp. F) or decreasing (Comp. G) the amount of polymer polyol in conjunction with the 50/50 blend of Polyisocyanates 1 and 2, in comparison to Ex. 1 (Table 2). Compression set increases somewhat for Comp. Sample F. Even at this moderately increased level the compression set is higher than is wanted for bedding applications. Compression set becomes extremely high in Comp. Sample G. Again, the latent heat is zero in all cases due to the lack of phase change material.

EXAMPLES 4-8

Examples 4-8 are made from recipes as set forth in Table 4. Results of the foam testing of these samples are as indicated in Table 4.

TABLE 4

| | Parts by Weight | | | | |
|---|---|---|---|---|---|
| Ingredient | Ex. 4 | Ex. 5 | Ex. 6 | Ex. 7 | Ex. 8 |
| Water | 24.5 | 29.5 | 27.0 | 22.5 | 24.5 |
| Surfactant A | 1.75 | 1.75 | 1.75 | 1.75 | 1.75 |
| Surfactant B | 1.75 | 1.75 | 1.75 | 1.75 | 1.75 |
| CPP | 17 | 17 | 15 | 13 | 15 |
| PCM | 5 | 0 | 2.5 | 10 | 5 |
| Poly(EO) | 0 | 5 | 2 | 2 | 2 |
| Polyisocyanate 1 | 25 | 25 | 25 | 25 | 25 |
| Polyisocyanate 2 | 25 | 25 | 25 | 25 | 25 |
| | | Results | | | |
| Moisture Wicking, s | 4 | 4 | 4 | 4 | 4 |
| Density, lb/ft$^3$ (kg/m$^3$) | 4.14 (66.2) | 4.07 (65.1) | 4.27 (68.3) | 4.52 (72.3) | 4.93 (78.9) |
| Airflow, scfm (L/s) | 1.55 (0.73) | 5.3 (2.49) | 4.28 (2.01) | 1.84 (0.86) | 3.05 (1.43) |
| 90% Compression Set, % | 2.7 | 3.8 | 2.8 | 2.9 | 4.2 |
| Latent Heat at 27° C. (J/g) | 14.9 | 0 | 4.7 | 20.1 | 14.1 |
| k-factor | 0.3 | 0.3 | 0.3 | 0.3 | 0.3 |

*Not an example of the invention.

All of Examples 4-8 exhibit very low compression sets.

The presence of the phase change material in Example 4 has three effects, as shown in comparison to Example 1. Compression set becomes even lower than Example 1, and a positive latent heat is seen at 27° C. Some loss of airflow is seen.

Example 5 shows the effect of including component f) in the reaction mixture, in the absence of a phase change material. When compared with Example 1, compression set is significantly lower and a higher airflow is obtained. The latent heat at 27° C. is zero due to the lack of a phase change material.

Examples 6-8 show the effect of including both component f) and the phase change material. Compression sets are extremely low and airflows are improved relative to Example 4, which has the phase change material but no component f). This is seen even at a very high level of phase change material (Ex. 7). Airflows for Examples 6 and 8 are comparable or higher than those of Example 1, despite the presence of the phase change material.

What is claimed is:

1. A flexible polyurethane foam comprising a reaction product of a reaction mixture that comprises
   a) an isocyanate mixture comprising
   a-1) a first isocyanate-functional prepolymer, which first isocyanate-functional prepolymer is a reaction product of at least one hydroxyl-terminated polymer of ethylene oxide and optionally a hydroxyl-functional branching agent and/or hydroxyl-functional chain extender with an excess of diphenylmethane diisocyanate of which diphenylmethane diisocyanate at least 50 weight-% is 4,4'-diphenylmethane diisocyanate,
   a-2) optionally diphenylmethane diisocyanate, wherein components a-1) and a-2) together have an isocyanate content of 5 to 15% by weight and contain 30 to 75 weight percent of oxyethylene units, based on the combined weight of components a-1) and a-2), and components a-1) and a-2) together constitute 40 to 60% of the total weight of the isocyanate mixture,
   a-3) a second isocyanate-functional prepolymer, which second isocyanate-functional prepolymer is a reaction product of at least one hydroxyl-terminated polymer of ethylene oxide and a hydroxyl-functional branching agent having at least three hydroxyl groups per molecule and a hydroxyl equivalent weight of up to 250 g/equivalent with an excess of toluene diisocyanate, and
   a-4) optionally toluene diisocyanate, wherein a-3) and a-4) together have an isocyanate content of 5 to 15% by weight and contain 30 to 75 weight percent of oxyethylene units, based on the combined weight of components a-3) and a-4) and 2 to 5% by weight of residues from the hydroxyl-functional branching agent, based on the combined weight of components a-3) and a-4); components a-3) and a-4) together constitute 40 to 60% of the total weight of the isocyanate mixture; and components a-1), a-2), a-3) and a-4) together constitute the entire weight of the isocyanate mixture;
   b) water;
   c) at least one polymer polyol comprising polymer particles dispersed in at least one base polyol, the base polyol being a polyether having at least 50% by weight oxypropylene units and a hydroxyl equivalent weight of 500 to 3000 g/equivalent;
   d) optionally a poly(ethylene oxide), the poly(ethylene oxide) being a homopolymer of ethylene oxide homopolymer or a random and/or block copolymer of at least 80% by weight ethylene oxide and up to 20% by weight of another alkylene oxide, the poly(ethylene oxide) having a number average molecular weight of 400 to 1200 g/mol;
   at least one of e) and f), wherein e) is at least one silicone surfactant; and f) is at least one ethylene oxide/higher alkylene oxide block copolymer, the block copolymer containing 40 to 90% by weight oxyethylene units and having a number average molecular weight of 1500 to 12,000 g/mol; and optionally
   g) at least one phase change material that has a melting or glass transition temperature of 25 to 37° C. and which does not contain isocyanate groups or isocyanate-reactive groups;
   wherein
   i) the isocyanate mixture constitutes 40 to 65% of the combined weights of components a-g;

ii) water constitutes 15 to 41% of the combined weights of components a-g;

iii) the at least one polymer polyol constitutes 8 to 20% of the combined weights of components a-g and the polymer particles constitute 0.5 to 10% of the combined weights of components a-g;

iv) the poly(ethylene oxide) when present constitutes up to 5% of the combined weights of components a-g;

v) the at least one silicone surfactant constitutes 0 to 3% of the combined weights of components a-g;

vi) the at least one ethylene oxide/higher alkylene oxide block copolymer constitutes 0 to 3% of the combined weights of components a-g;

vii) the at least one phase change material constitutes up to 15% of the combined weights of components a-g and viii) components a-g constitute at least 95% of the weight of the reaction mixture.

2. The flexible polyurethane foam of claim 1 wherein the phase change material comprises any one or more of a natural or synthetic wax.

3. The flexible polyurethane foam of claim 2 wherein the phase change material constitutes 2.5 to 10 percent of the total weight of components a-g.

4. The flexible polyurethane foam of claim 2 wherein components a-1) and a-2) together constitute 45 to 55% of the weight of the isocyanate mixture and components a-3) and a-4) together correspondingly constitute 55 to 45% of the weight of the isocyanate mixture.

5. The flexible polyurethane foam of claim 2 wherein the silicone surfactant and the ethylene oxide/higher alkylene oxide block copolymer each constitute 0.5 to 3% of the combined weights of components a-g.

6. The flexible polyurethane foam of claim 2 wherein the silicone surfactant contains 25 to 70% by weight polysiloxane, 10 to 75% by weight polymerized ethylene oxide and 0 to 10% by weight polymerized propylene oxide, based on the weight of the silicone surfactant.

7. The flexible polyurethane foam of claim 2 wherein the phase change material comprises any one or more of a polyethylene wax, bees wax, lanolin, carnauba wax, candelilla wax, ouricury wax, sugarcane wax, jojoba wax, epicuticular wax, coconut wax, petroleum wax or paraffin wax.

8. The flexible polyurethane foam of claim 2 wherein the poly(ethylene oxide) constitutes 0.5 to 5% of the combined weights of components a-g.

9. A cushion comprising a flexible polyurethane foam of claim 1.

10. The cushion of claim 9, which is a pillow, mattress topper, mattress, comforter, furniture seat or back, automotive seat or back; quilt or article of insulated clothing, or a pad for a prosthetic limb.

11. The cushion of claim 9, wherein the flexible polyurethane foam, when dried to a constant weight, has a density of 48 to 80 kg/m$^3$ and a compression set of 10% or less.

12. The cushion of claim 9 wherein the flexible polyurethane foam, when dried to a constant weight, exhibits a latent heat of at least 2.5 J/g at 27° C. and a moisture wicking time of 5 seconds or less.

13. A method of making a flexible polyurethane foam, comprising

A. forming a reaction mixture by mixing:

a) an isocyanate mixture comprising a-1) a first isocyanate-functional prepolymer, which first isocyanate-functional prepolymer is a reaction product of at least one hydroxyl-terminated polymer of ethylene oxide and optionally a hydroxyl-functional branching agent and/or a hydroxyl-functional chain extender with an excess of diphenylmethane diisocyanate of which diphenylmethane diisocyanate at least 50 weight-% is 4,4'-diphenylmethane diisocyanate, a-2) optionally diphenylmethane diisocyanate, wherein components a-1) and a-2) together have an isocyanate content of 5 to 15% by weight and contain 30 to 75 weight percent of oxyethylene units, based on the combined weight of components a-1) and a-2), and components a-1) and a-2) together constitute 40 to 60% of the total weight of the isocyanate mixture, a-3) a second isocyanate-functional prepolymer, which second isocyanate-functional prepolymer is a reaction product of at least one hydroxyl-terminated polymer of ethylene oxide and a hydroxyl-functional branching agent having at least three hydroxyl groups per molecule and a hydroxyl equivalent weight of up to 250 g/equivalent with an excess of toluene diisocyanate, and a-4) optionally toluene diisocyanate, wherein a-3) and a-4) together have an isocyanate content of 5 to 15% by weight and contain 30 to 75 weight percent of oxyethylene units, based on the combined weight of components a-3) and a-4) and 2 to 5% by weight of residues from the hydroxyl-functional branching agent, based on the combined weight of components a-3) and a-4); components a-3) and a-4) together constitute 40 to 60% of the total weight of the isocyanate mixture; and components a-1), a-2), a-3) and a-4) together constitute the entire weight of the isocyanate mixture;

b) water;

c) at least one polymer polyol comprising polymer particles dispersed in at least one base polyol, the base polyol being a polyether having at least 50% by weight oxypropylene units and a hydroxyl equivalent weight of 500 to 3000 g/equivalent;

d) optionally a poly(ethylene oxide), the poly(ethylene oxide) being a homopolymer of ethylene oxide homopolymer or a random and/or block copolymer of at least 80% by weight ethylene oxide and up to 20% by weight of another alkylene oxide, the poly(ethylene oxide) having a number average molecular weight of 400 to 1200 g/mol;

at least one of e) and f), wherein e) is at least one silicone surfactant; and f) is at least one ethylene oxide/higher alkylene oxide block copolymer, the block copolymer containing 40 to 90% by weight oxyethylene units and having a number average molecular weight of 1500 to 12,000 g/mol; and optionally g) at least one phase change material that has a melting or glass transition temperature of 25 to 37° C. and which does not contain isocyanate groups or isocyanate-reactive groups;

wherein i) the isocyanate mixture constitutes 40 to 65% of the combined weights of components a-g;

ii) water constitutes 15 to 41% of the combined weights of components a-g;

iii) the at least one polymer polyol constitutes 8 to 20% of the combined weights of components a-g and the polymer particles constitute 0.5 to 10% of the combined weights of components a-g;

iv) the poly(ethylene oxide) when present constitutes up to 5% of the combined weights of components a-g;

v) the at least one silicone surfactant constitutes 0 to 3% of the combined weights of components a-g;

vi) the at least one ethylene oxide/higher alkylene oxide block copolymer constitutes 0 to 3% of the combined weights of components a-g;

vii) the at least one phase change material constitutes up to 15% of the combined weights of components a-g and viii) components a-g constitute at least 95% of the weight of the reaction mixture and B. reacting the reaction mixture to produce the foam.

14. The method of claim 13 wherein the phase change material constitutes 2.5 to 10 percent of the total weight of components a-g and the phase change material comprises any one or more of a natural or synthetic wax.

15. The method of claim 14 wherein the silicone surfactant and the ethylene oxide/higher alkylene oxide block copolymer each constitute 0.5 to 3% of the combined weights of components a-g, the silicone surfactant contains 25 to 70% by weight polysiloxane, 10 to 75% by weight polymerized ethylene oxide and 0 to 10% by weight polymerized propylene oxide, based on the weight of the silicone surfactant.

16. The method of claim 14 wherein the phase change material comprises any one or more of a polyethylene wax, bees wax, lanolin, carnauba wax, candelilla wax, ouricury wax, sugarcane wax, jojoba wax, epicuticular wax, coconut wax, petroleum wax or paraffin wax.

* * * * *